United States Patent [19]

Postma et al.

[11] Patent Number: 5,483,735
[45] Date of Patent: Jan. 16, 1996

[54] METHOD OF MANUFACTURING A THIN-FILM MAGNETIC HEAD

[75] Inventors: Lambertus Postma; Jan Haisma; Jacobus J. M. Ruigrok; Gerardus H. J. Somers, all of Eindhoven, Netherlands

[73] Assignee: U.S. Philips Corporation, New York, N.Y.

[21] Appl. No.: 216,573

[22] Filed: Mar. 22, 1994

[30] Foreign Application Priority Data

Mar. 22, 1993 [BE] Belgium ............................... 09300274
Apr. 6, 1993 [EP] European Pat. Off. ............. 93200993

[51] Int. Cl.⁶ ................................................... G11B 5/127
[52] U.S. Cl. ........................................ 29/603; 360/113
[58] Field of Search .............................. 29/603; 360/113, 360/120; 451/28, 36, 41, 56, 57

[56] References Cited

U.S. PATENT DOCUMENTS

| | | | |
|---|---|---|---|
| 4,052,748 | 10/1977 | Kuijk ........................................ | 360/113 |
| 4,550,353 | 10/1985 | Hirai et al. ............................. | 29/603 X |
| 4,837,924 | 6/1989 | Lazzari ..................................... | 29/603 |

FOREIGN PATENT DOCUMENTS

| | | |
|---|---|---|
| 92201739 | 8/1992 | European Pat. Off. .. |
| 0516022 | 12/1992 | European Pat. Off. .. |
| 62-092219 | 4/1987 | Japan . |
| 01289224 | 2/1990 | Japan . |

OTHER PUBLICATIONS

IBM Technical Disclosure Bulletin, vol. 27, No. 8, Jan., 1985, "Glass Planarization By Stop–Layer Polishing" by K. D. Beyer et al, pp. 4700–4701.

Primary Examiner—S. Thomas Hughes
Attorney, Agent, or Firm—John C. Fox

[57] ABSTRACT

Method of manufacturing a magnetoresistive magnetic head in which a first insulation layer (5) of a non-magnetic material is formed on a support face (3a), on which insulation layer a soft-magnetic layer having an upper face remote from the first insulation layer is formed by deposition of a soft-magnetic material. Subsequently a layer portion is removed for forming the flux-guiding elements (17a, 17b) and an aperture extending between said elements, and non-magnetic material for forming a second insulation layer (18) having an upper face remote from the soft-magnetic layer is deposited on the soft-magnetic layer and in the aperture formed therein, which second insulation layer has such a thickness that, viewed in a direction transverse to the support face, the smallest distance between the support face and the upper face of the second insulation layer is larger than the largest distance between the support face and the upper face of the soft-magnetic layer. Subsequently, a mechanochemical polishing treatment is performed as from the upper face of the second insulation layer for forming a main surface (19) at which magnetoresistive material is subsequently deposited for forming a magnetoresistive element (23).

24 Claims, 10 Drawing Sheets

METHOD OF MANUFACTURING A THIN-FILM MAGNETIC HEAD

BACKGROUND OF THE INVENTION

The invention relates to a method of manufacturing a thin-film magnetic head comprising a magnetoresistive element and at least one flux-guiding element, which method starts from a support.

Methods of manufacturing thin-film magnetic heads are known, inter alia from EP-A 0 5 16 022 (herewith incorporated by reference). The magnetic heads obtained by means of the methods described in EP-A 0 5 16 022 are integrated magnetic heads having a contact face and comprising an inductive part and a magnetoresistive In accordance with a first method known from EP-A 0 516 022, a first structured insulation layer of $SiO_2$ is formed on a magnetic substrate of a ferrite by means of a lithographic method, which layer is subsequently provided with a layer of Au for forming a write coil. Subsequently, a second structured insulation layer is provided on which a core layer of an amorphous material based on Co is deposited. This core layer is in contact with the magnetic substrate via apertures in the insulation layers. The parts of the second insulation layer not coated by the core layer are filled up by means of a filling layer of $Al_2O_3$. After the filling layer has been formed, the core layer and the filling layer are planed by means of lapping. A third structured insulation layer of $SiO_2$ is deposited on the surface thus obtained on which subsequently a bias winding of Au is formed. A fourth structured insulation layer of $SiO_2$ is provided on this winding. Subsequently, a magnetoresistive element of permalloy is formed on this insulation layer. Then a fifth structured insulation layer of $SiO_2$ is provided and subsequently a yoke of an amorphous material which is based on Co and is in contact with the core layer via apertures in the three last-mentioned insulation layers.

In accordance with a second method known from EP-A 0 516 022, two flux guides of a Co-based amorphous material are provided on a non-magnetic substrate, while an aperture between the two flux guides is filled with a first insulation layer of $SiO_2$. The surface formed by the flux guides and the first insulation layer is provided with a second structured insulation layer on which subsequently a magnetoresistive (MR) element is formed. The MR element is then coated with a third structured insulation layer on which subsequently a bias winding is formed. A fourth structured insulation layer is provided for the purpose of coating the bias winding. Subsequently, a magnetic core layer of a Co-based material is formed which is in contact with one of the flux guides via apertures in the three last-mentioned insulation layers. The areas not coated by the first core layer are filled up with a filling layer of $Al_2O_3$, whereafter a surface on which an inductive head part is formed is obtained by lapping.

In the methods known from EP-A 0 516 022, the MR element is formed on an insulation layer which is provided on a lapping-processed surface. However, it has been found that such a surface extending on two or more adjacent layers of different material has unevennesses. Moreover, damage particularly in the form of scratches in and disturbances of material under the surface obtained are caused by lapping. Such a surface is inadmissible, inefficient for information transfer and may increase the risk of instabilities in the MR element provided on said surface.

The magnetic heads obtained by the methods known from EP-A 0 516 022 have the further drawback that due to the presence of irregularities on the surface engaging the MR element, a relatively thick insulation layer is required between the MR element and the electrically conducting flux guides so as to ensure a reliable electrical insulation between the MR element and the flux guides. However, such insulation layers have a further negative influence on the efficiency of the magnetic heads. For various reasons, damage in and material disturbance under a surface above which the MR element is present are thus undesirable.

OBJECTS AND SUMMARY OF THE INVENTION

It is an object of the invention to provide a method of manufacturing a magnetic head described in the opening paragraph in which the magnetoresistive element is provided on a surface which is accurately defined as regards planeness and structure.

To this end the method according to the invention is characterized in that a first insulation layer of a non-magnetic material is formed on a support face, on which insulation layer a soft-magnetic layer having an upper face remote from the first insulation layer is formed by depositing a soft-magnetic material, whereafter a layer portion is removed for forming the flux-guiding element, whereafter non-magnetic material is deposited on a remaining portion of the soft-magnetic layer and on a free portion of the first insulation layer for forming a second insulation layer having an upper face remote from the soft-magnetic layer, said second insulation layer having such a thickness that, viewed in a direction transverse to the support face, the smallest distance between the support face and the upper face of the second insulation layer is larger than the largest distance between the support face and the upper face of the soft-magnetic layer, whereafter a mechanochemical polishing treatment is performed as from the upper face of the second insulation layer for forming a main surface at which magnetoresistive material is subsequently deposited for forming the magnetoresistive element.

In the method according to the invention, a very plane and smooth main surface which is free from damage is obtained for providing the magnetoresistive element (MR element) in an electrically insulated manner, which results in a magnetic head having a stable MR element and an efficiency which is improved with respect to that of the known magnetic heads.

Nucleation of domain walls or formation of small areas having an unwanted direction of magnetization and unwanted, sudden changes of magnetization during the read process are obviated as much as possible in a magnetoresistive element provided on a surface which is free from defects.

It is to be noted that mechanochemical polishing is performed with the aid of a working surface of a polishing tool which is urged against and moved across the surface to be polished. The working surface is provided with a liquid mechanochemical polishing agent. This is an agent with which chemical and mechanical polishing is simultaneously possible.

It is further to be noted that polishing without damage can be realised by purely chemical polishing. This method has drawbacks. The geometrical control, i.e. the planeness of the surface is far from optimal and many chemical polishing agents are more or less toxic and aggressive and should consequently be used in an extremely protected environment, which is a drawback in mass production. The mechanochemical polishing operation, in which components mechanically removed from the surface to be polished are chemically dissolved, leads to a very smooth and plane polished surface which is free from damage.

An embodiment of the method according to the invention is characterized in that the mechanochemical polishing treatment is performed down to the soft-magnetic layer. In this method according to the invention the mechanochemical polishing treatment is performed on non-magnetic material as well as on soft-magnetic material. It has surprisingly been found that despite the consequently different material properties mechanochemically polishing yields a very plane and smooth main surface without the materials themselves undergoing any structural changes. It has also been found that if one of the materials to be polished is very hard, the mechanical aspect of mechanochemically polishing will be enhanced by adding a small quantity of hard, adequate grains to the polishing agent of the mechanochemical type. Thus, even when using combinations of materials of divergent mechanical hardnesses, smooth and plane surfaces which are free from damage can be realised in the manufacture of magnetic heads.

An embodiment of the method according to the invention is characterized in that a spacer layer of a non-magnetic, electrically insulating material, on which the magnetoresistive material is deposited, is formed on the main surface obtained by means of mechanochemical polishing. The spacer layer may be formed from known materials such as quartz or zirconia which can be provided in a well-defined manner by means of known techniques. This method according to the invention is particularly important if use is made of electrically conducting soft-magnetic materials for forming the flux-guiding elements. In that case an insulating spacer layer is necessary in order to prevent electrical contact between the flux-guiding elements and the MR element.

A drawback of a magnetic head having a spacer layer between the MR element and the flux-guiding elements is, however, that due to the distance between the MR element and the flux-guiding elements caused by the thickness of the spacer layer only a portion of the magnetic flux originating during operation from a magnetic recording medium is passed through the MR element. For reasons of efficiency it is therefore of essential importance that such a layer can be made as thin as possible. Since the thickness of the spacer layer is determined to a considerable extent by the quality of the main surface, this spacer layer may be perfectly smooth and have no thickness variations when the method according to the invention is used, and, moreover, it may be very thin, for example 0.2 μm with respect to the layer thicknesses of at least 0.6 μm required in the known magnetic heads, without any risk of short-circuit of the MR element.

An embodiment of the method according to the invention is characterized in that the second insulation layer is mechanochemically polished up to a predetermined distance to the upper face of the soft-magnetic layer, whereafter the magnetoresistive material is deposited on the main surface obtained. This embodiment has the advantage that only one type of material is to be polished mechanochemically. The use of one type of material and consequently mechanochemically polishing one material has the great advantage that both the thickness of the layer to be deposited, and the rate of removal during mechanochemical polishing can be determined accurately. Both factors ensure reliable geometrical control of the desired layer thickness.

If the mechanochemical polishing process is to proceed satisfactorily, it is essential that the second insulation layer of the given thickness is planarized. If the second insulation layer is planarized, it is either possible to stop in this insulation layer at a desired level or to continue polishing down to the soft-magnetic layer. It is recommended to take hardness differences between the non-magnetic material and the soft-magnetic material into account from the start of the mechanochemical polishing process.

An embodiment of the method according to the invention is characterized in that a plate-shaped substrate is used which is provided with two parallel substrate faces by means of mechanical and/or mechanochemical polishing, whereafter one of these faces is used as a support face. The other face is used as a reference face in the further process steps.

The parallel substrate faces may be obtained by starting from a substrate having two substrate faces, the substrate faces being first prepared by means of polishing until they have a convex, plane or concave initial shape, whereafter a removal cycle is run through at least once, during which the substrate faces of a substrate whose edges are thicker than a central piece surrounded by the edges are polished in such a way that the edges successively acquire a substantially equal thickness, a smaller thickness and again a substantially equal thickness as the central piece, and during which cycle the substrate faces of a substrate whose edges are thinner than a central piece surrounded by the edges are polished in such a way that the edges successively acquire a substantially equal thickness, a larger thickness and again a substantially equal thickness as the central piece. The above-mentioned method of manufacturing parallel faces is described extensively in European Patent Application 92201739.7 (corresponds to U.S. patent application Ser. No. 071,908, filed Jun. 3, 1993) (PHN 14.081); herewith incorporated by reference.

Substrates having parallel substrate faces have the great advantage that they can be used in a mass manufacturing process for the further steps of the method. Consequently, mechanochemical polishing steps can be performed at a larger stage for the purpose of smoothing and planting a layer having a single or multiple material structure and for stop-polishing a layer having a multiple material structure, but of which only one or some materials of the layer can be polished via the mechanochemical polishing process and the other material cannot be polished.

An embodiment of the method is characterized in that the substrate is formed from a soft-magnetic material, particularly a ferrite.

It is to be noted hat a ferrite is understood to be a magnetic material of, for example one of the following crystallographic groups: garnets, spinels, perovskites. Favourable properties of ferrite are its great wear resistance and its satisfactory shielding effect against disturbing fields. The stability of a magnetoresistive head is usually also favourably influenced by the effect of the ferrite on the thin-film flux-guiding elements and the magnetoresistive element. Moreover, a ferrite substrate has the technological advantage that the substrate can be used as a flux-guiding layer.

An embodiment is characterized in that a base element is used on which an inductive transducing element, a base layer of a non-magnetic material and a flux-guiding layer are provided, whereafter a mechanochemical polishing treatment is performed for forming the support face. The base layer may be provided with a recess by removing material from a side remote from the base element, preferably by means of etching, which recess is subsequently filled up with a soft-magnetic material for forming the flux-guiding layer. This method yields a magnetic head having a write function as well as a read function. During the method a write portion and subsequently a read portion is formed. In order to ensure an accurately defined main surface, the base layer is also mechanochemically polished in this embodiment. A magnetical advantage on making a planar write portion cannot be achieved. However, a maximum planeness is necessary to obtain a planar read portion having the previously mentioned advantages.

An embodiment is characterized in that the base element is plate-shaped and is provided with two parallel base faces by means of mechanical and/or mechanochemical polishing, whereafter the base layer is formed on one of said faces. The parallel base faces may be obtained by means of the method described in European Patent Application no. 92201739.7 corresponds to U.S. patent application Ser. No. 071,908). Also in this case elements with parallel faces have advantages as far as mass manufacture, mechanochemical polishing of single materials and mechanochemical polishing of distributed materials are concerned.

An embodiment is characterized in that the base element is formed from a soft-magnetic material, particularly a ferrite.

An embodiment is characterized in that the main layer is formed from quartz. Quartz may be provided, for example by means of PE-CVD. It has been found that if the mechanochemical polishing treatment is performed down to the soft-magnetic material, the soft-magnetic material of the flux-guiding elements will hardly have any influence on the eminent result of the mechanochemical polishing process, notably in so far as the surface is plane and free from damage.

An embodiment is characterized in that the main layer is formed from zirconia. Zirconia is a crystalline material in a cubic form. The main constituent is $ZrO_2$ to which 5–10 at. % of CaO or $Y_2O_3$ are added. Zirconia, which may be provided, for example by sputtering, is a mechanically hard and wear-resistant material. Probably due to its great hardness, zirconia, together with all soft-magnetic materials to be further described, forms a substantially perfect main surface after mechanochemical polishing.

It is to be noted that zirconia and the much softer quartz can be subjected to similar polishing treatments when the mechanochemical polishing process is optimized. As compared with zirconia, quartz has technological advantages because it can be easily deposited and etched. As compared with quartz, zirconia has the advantage that it is much more wear-resistant.

An embodiment is characterized in that an alloy from the group of alloys formed by CoZrNb alloys, FeNbSi alloys, FeSiAl alloys and NiFe alloys is used as a soft-magnetic material. These materials may be provided by means of known techniques such as sputtering or vapour deposition. In the present invention the soft-magnetic material is etched for forming the flux-guiding element. NiFe and FeNbSi alloys can relatively easily be etched wet-chemically. For CoZrNb and FeSiAl alloys sputter-etching or reactive ion etching is preferably used.

An embodiment is characterized in that a ferrite is used as a soft-magnetic material. A ferrite usually has such a high resistivity that the MR element can be directly provided on the flux-guiding elements formed from such a material without resulting in any noticeable loss of sensitivity of the magnetic head. In other words, when a ferrite is used, in which an MnZn ferrite or an NiZn ferrite is preferred, the spacer layer may be omitted in the method according to the invention and a layer of a magnetoresistive material may thus be directly provided on the main surface for forming the MR element. Consequently, a direct magnetic coupling between the MR element and the flux-guiding elements is possible. Such a coupling results in a high efficiency of the magnetic head obtained. Ferrites can be provided by means of known techniques such as sputtering, MO-CVD or laser ablation.

The magnetic head obtained by means of the method according to the invention is provided with a head face for cooperation with a magnetic recording medium, particularly a magnetic tape or disc, while a flux-guiding element terminates in the head face. In this connection ferrite flux-guiding elements have the advantage that the ferrite contributes to the corrosion resistance and the wear resistance of the head face.

An embodiment is characterized in that an NiFe alloy is used as a magnetoresistive material. The NiFe alloy can be provided by means of known techniques such as sputter-deposition or vapour deposition. The MR element formed from NiFe is provided with contact faces for realising an electrical connection with a read device. Preferably, equipotential strips having a satisfactory electrical conductivity are provided on the NiFe layer formed so as to linearize the behaviour of the MR element. This measure is described in U.S. Pat. No. 4,052,748 (herewith incorporated by reference).

An embodiment is characterized in that the base layer is formed from quartz.

An embodiment is characterized in that the base layer is formed from zirconia.

An embodiment is characterized in that the recess in the base layer is provided by etching.

An embodiment is characterized in that the mechanochemical polishing treatment is performed with a colloidal suspension of $SiO_2$ particles in an alkali solution, particularly a KOH or NaOH solution. A colloidal suspension of $SiO_2$ nano particles may be used for this purpose, having, for example an average grain size of 30 nm. The NaOH or KOH solution may have a pH of approximately 10.

It is to be noted that mechanochemical polishing is known per se from IBM Technical Disclosure Bulletin, vol 27, no. 8, January 1985. This publication describes mechanochemical polishing of a glass structure. It is also known per se to use an agent commercially available under the trade name Syton for the mechanochemical polishing process.

An embodiment is characterized in that the mechanochemical polishing treatment is performed with a mechanochemical polishing agent comprising a colloidal $SiO_2$ solution in which grains are present which have an average particle size of less than 1.0 micrometer and a hardness which is better than the hardness of $SiO_2$. This method according to the invention yields a very smooth mechanochemically polished main surface. It has been found that a surface roughness R(rms) of the polished surface smaller than 1 nm can be achieved. Measurements have shown that there is no damage or defect of the material structure of the mechanochemically polished surface. The above also applies to mechanochemical polishing of the substrate and the base layer.

The exact effect of the above-mentioned mechanochemical polishing agent is not known. It is assumed that, in solution, the grains are enveloped by $SiO_2$ nano particles due to electrostatic forces, which enveloped particles chemically and mechanically attack the surface to be polished, while chemically attacked parts of the surface to be polished are relatively easily removed under mechanical pressure.

Experiments have proved that optimum polishing results are achieved at an average particle size of less than 1.0 μm. It is therefore preferred to use grains whose average particle size is less than 1.0 micrometer, for example 100 nanometer. It is also preferred that the concentration of the grains in the colloidal solution is less than 1 g per liter. This solution is preferably alkaline and is, for example a KOH or NaOH solution.

$Al_2O_3$ or zirconia is suitable as a material for the grains, but diamond is preferred because the materials are to be polished. A colloidal $SiO_2$ solution provided with diamond grains having an average particle size of less than 1.0 μm is therefore preferred as a polishing agent.

The invention also relates to a thin-film magnetic head obtained by the method according to the invention and having a head face for cooperation with a magnetic recording medium, in which the flux-guiding element terminates in the head face. In the magnetic head according to the invention the magnetoresistive element has a very plane, accurately defined base, so that the magnetical stability of the magnetoresistive element is ensured. Due to the applied method according to the invention, corrosion-resistant and/or wear-resistant materials may be used for layers terminating in the head face, so that a long lifetime of the head face, hence of the complete magnetic head, is possible.

The invention also relates to a thin-film magnetic head obtainable by means of the method according to the invention and having a head face in which a flux-guiding element terminates, which magnetic head is characterized in that a further flux-guiding element spaced apart from said flux-guiding element is provided, a spacing between the two flux-guiding elements being bridged by a magnetoresistive element located opposite a mechanochemically polished second insulation layer. The presence of two flux-guiding elements guarantees a high efficiency.

BRIEF DESCRIPTION OF THE DRAWINGS

These and other aspects of the invention will be apparent from and elucidated with reference to the embodiments described hereinafter.

In the drawings

DESCRIPTION OF THE PREFERRED EMBODIMENTS

Figure 1:
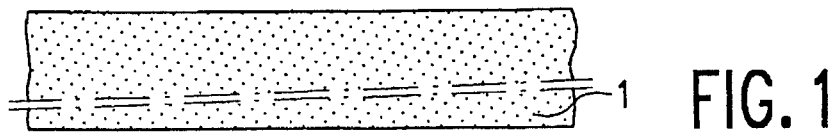
FIGS. 1 to 16 show various steps of a first embodiment of the method according to the invention.
Figure 2:
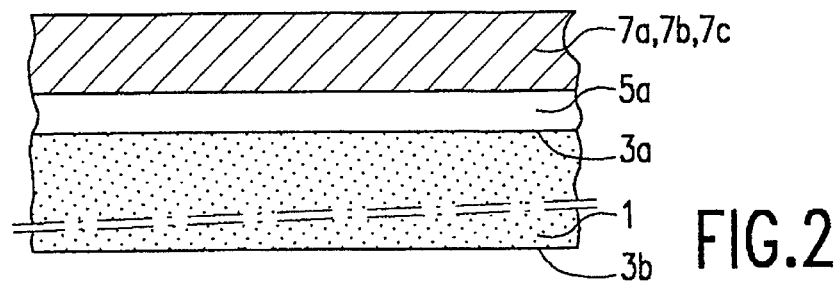
Figure 3:
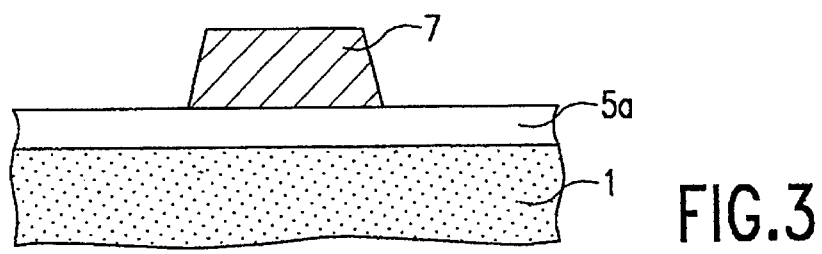
Figure 4:
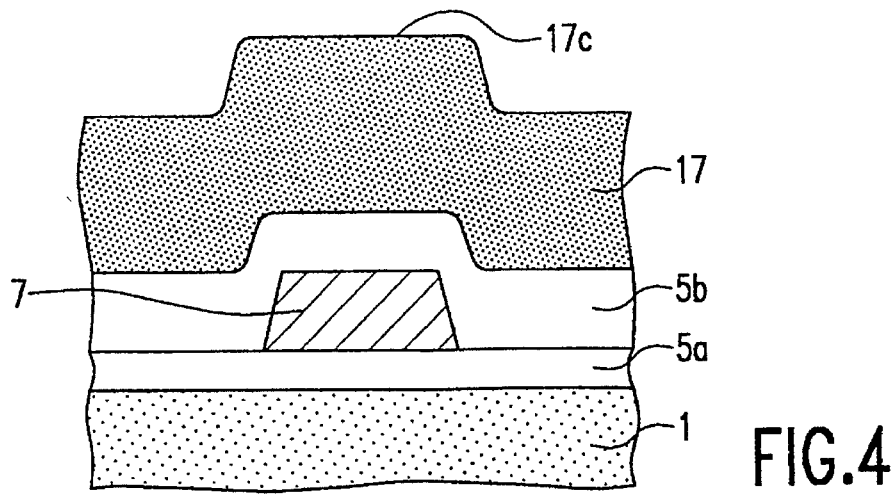
Figure 5:
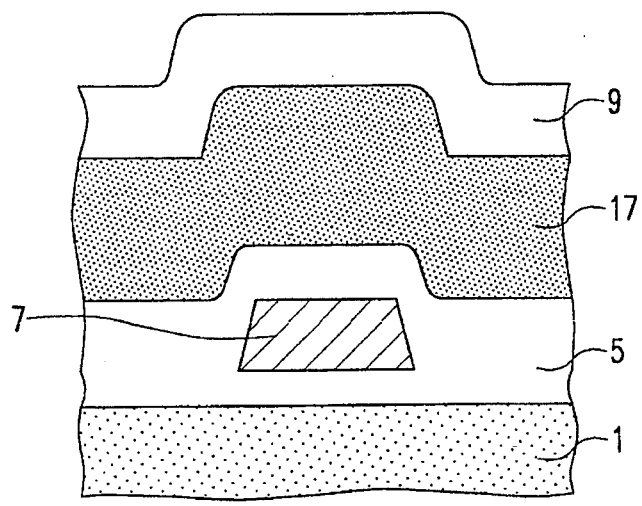
Figure 6:
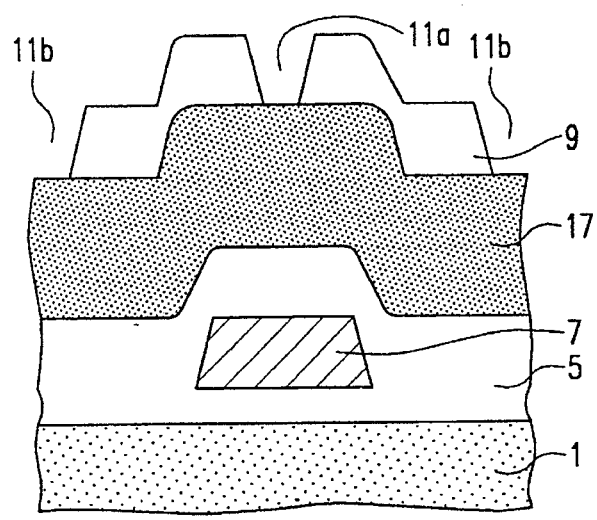
Figure 7:
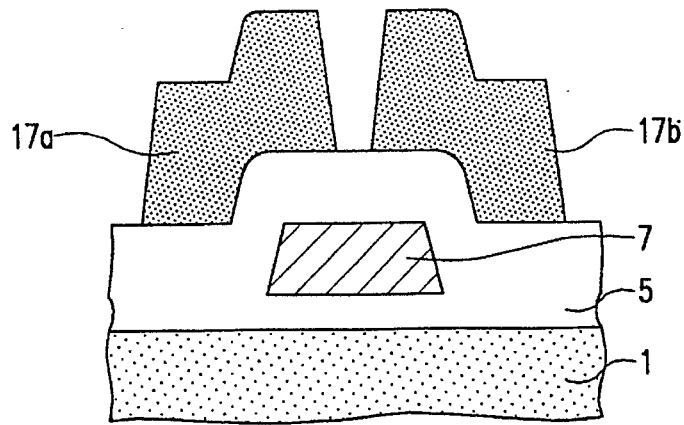
Figure 8:
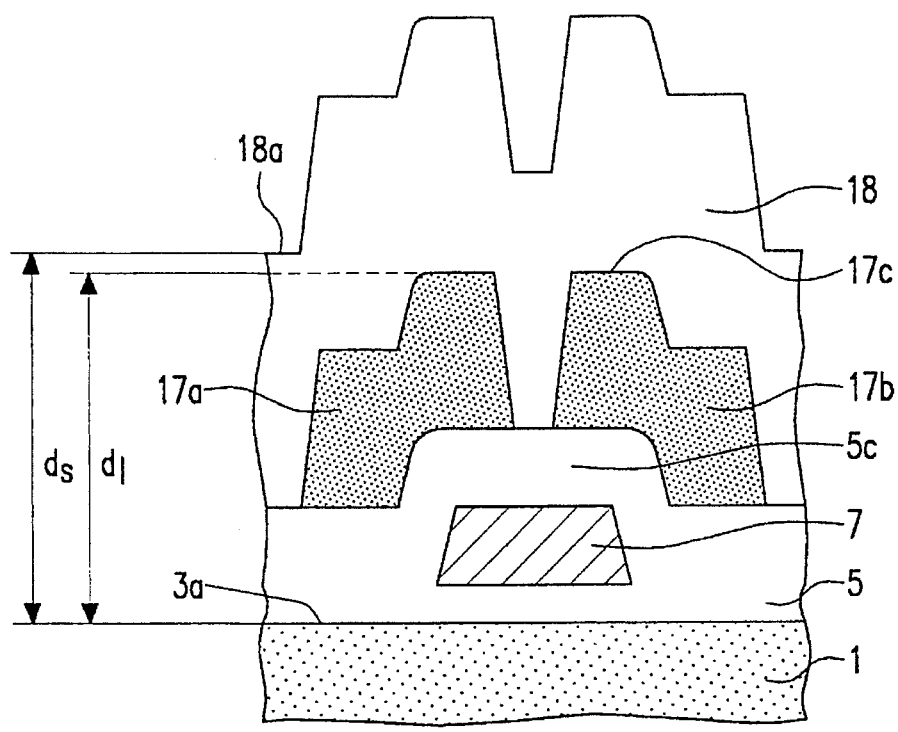

A first embodiment of the invention will be described with reference to FIGS. 1 to 17. This method starts from a plate-shaped substrate 1 of ferrite, an NiZn ferrite in this embodiment, which is provided with two parallel substrate faces 3a and 3b by means of polishing. Polishing may be effected by means of known polishing methods, but the method described in European Patent Application no. 92201739.7 U.S. application Ser. No. 071,908 is preferably used. An insulation layer 5a of quartz is formed, for example by means of PE-CVD, on one of the substrate faces, in this embodiment the substrate face 3a serving as a support. Subsequently, an adhesive layer 7a of MO, a layer 7b of Au and an adhesive layer 7c of Mo are successively deposited on the layer 5a by means of, for example sputter-deposition for forming a test and/or bias winding 7. A photoresist layer is provided by means of, for example spin coating on the joint layers 7a, 7b, 7c. This layer is dried and subsequently exposed, using a suitable photomask. Subsequently the exposed photoresist is developed and then removed by rinsing in water. After subsequent heating and cooling, the layer 7c of Mo is etched whereafter the unexposed photoresist is removed by means of acetone and the layer 7b of Au is processed by means of sputter-etching with an Mo pattern as a mask. The winding 7 is obtained by subsequent etching of the Mo layer 7c.

An insulation layer 5b of quartz is provided by means of, for example PE-CVD on the layer 5a and the winding 7 on this layer. The layers 5a and 5b jointly constitute a first insulation layer 5 of a non-magnetic material. A soft-magnetic layer 17 having an upper face 17c remote from the first insulation layer 5 is formed, for example, by means of sputter-deposition of an FeNbSi alloy on the first insulation layer 5 provided on the substrate 1 functioning as a support, which insulation layer functions as a read gap. By heating FeNbSi after sputtering in a magnetic field, a layer is obtained which is both magnetically soft and mechanically hard and wear-resistant. Instead of an FeNbSi alloy it is also possible to use a CoZrNb alloy, an FeSiAl alloy or an NiFe alloy. A layer 9 of Mo is provided, for example by means of sputter-deposition on the soft-magnetic layer 17, whereafter Mo is removed by means of etching in the areas 11a and 11b for structuring the layer 9. Subsequently the soft-magnetic layer 17 is sputter-etched, with the structured layer 9 functioning as a mask and with the two layer portions 17a and 17b being left. After sputter-etching, the parts of the layer 9 possibly left are removed, for example by wet-chemical etching. Subsequently, a second insulation layer 18 having an upper face remote from the layer portions 17a and 17b is formed from quartz by means of, for example PE-CVD on the remaining portions 17a and 17b of the soft-magnetic layer 17 and on an interpositioned, bared portion 5c of the first insulation layer 5. Material is deposited until the second insulation layer 18 has a thickness at which the smallest distance $d_s$, between the upper face 18a and the support face 3a is larger than the largest distance $d_l$ between the upper face 17c and the support face 3a. The second insulation layer 18 thus formed is mechanochemically polished for forming a substantially perfectly plane and smooth main surface 19 which is free from defects.

Since the surface 18a of the second insulation layer 18 is uneven, the mechanochemical polishing treatment is initially performed on a small polishing surface. After some polishing, the polishing surface increases. The layer thickness of the second insulation layer 18 is chosen to be such, and the mechanochemical polishing process is adapted to be such that a plane and smooth surface p is already formed before the soft-magnetic material of the portions 17a and 17b is reached by mechanochemical polishing. This ensures that the main surface 19, which is partly formed by the non-magnetic material of the second insulation layer 18 and partly by the soft-magnetic material of the layer portions 17a and 17b, is plane, smooth and free from defects despite differences in hardness between the non-magnetic material and the soft-magnetic material. The remaining parts of the portions 17a and 17b of the soft-magnetic layer 17, which parts adjoin the main surface 19, form two flux-guiding elements which are denoted by 17A and 17B, respectively, in FIGS. 11 to 17. In this embodiment the mechanochemical polishing treatment, which is also referred to as tribochemical polishing in literature, is performed with a colloidal suspension of SiO₂ particles in an alkali solution, for example NaOH to which diamond grains having an average size of less than 1.0 μm are added. The concentration of the diamond grains in said solution is less than 1 g per liter.

A thin spacer layer 21 of a non-magnetic, electrically insulating material is provided on the plane, defectless main surface 19 obtained in the manner described above. In this embodiment quartz is deposited by means of PE-CVD for this purpose. A layer 23a of a magnetoresistive material is provided on the spacer layer 21, for which purpose an alloy of NiFe is sputtered in this embodiment. The layer 23a is subsequently structured by means of a photoresist mask and etching to form an MR element 23. A layer 25a of an electrically conducting material, for example Au is provided on the MR element 23, which layer is structured by means of a photoresist mask and etching to form equipotential strips 25 of a barberpole structure and to form electrically conducting strips 25b for electrically connecting the MR element to a measuring device (not shown). Subsequently an insulation layer 27 of, for example quartz is provided by means of, for example PE-CVD. Apertures 29 extending as far as the conducting strips 25b are etched in this insulation layer in order to provide electrical connections, whereafter a protective counterblock 31 of, for example BaTiO₃ or CaTiO₃ is secured by means of, for example an adhesive. The layer 27 may be planed to a desired thickness in advance, for example by mechanical polishing or lapping. The unit now obtained is provided with a head face 33 for cooperation with a magnetic recording medium, particularly a magnetic tape by means of operations such as grinding and/or lapping.

If the soft-magnetic material of the flux-guiding elements 17A and 17B, and hence of the soft-magnetic layer 17 which was originally present, is replaced by a soft-magnetic material which does not conduct electrically or has a poor electrical conductance, particularly an MnZn ferrite, an NiZn ferrite or Fe₂O₃ ferrite, the MR element 23 may be directly provided on the main surface 19. Consequently, the insulation layer 21 may be dispensed with and the MR element 23 may be in direct magnetical contact with the flux-guiding elements 17A and 17B.

Figure 9:
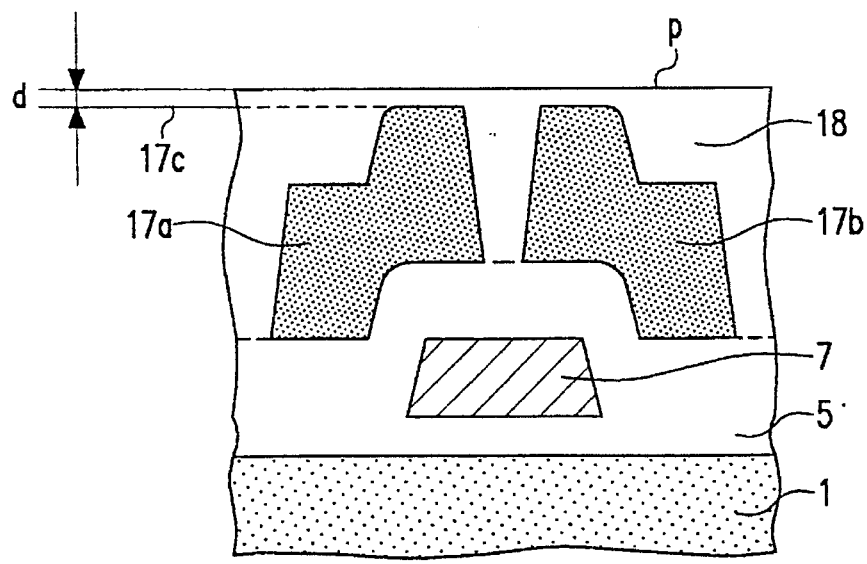
Figure 10:
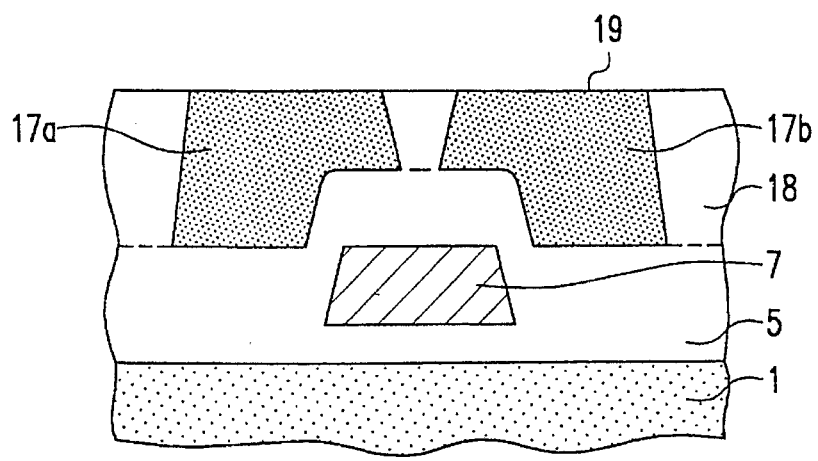
Figure 11:
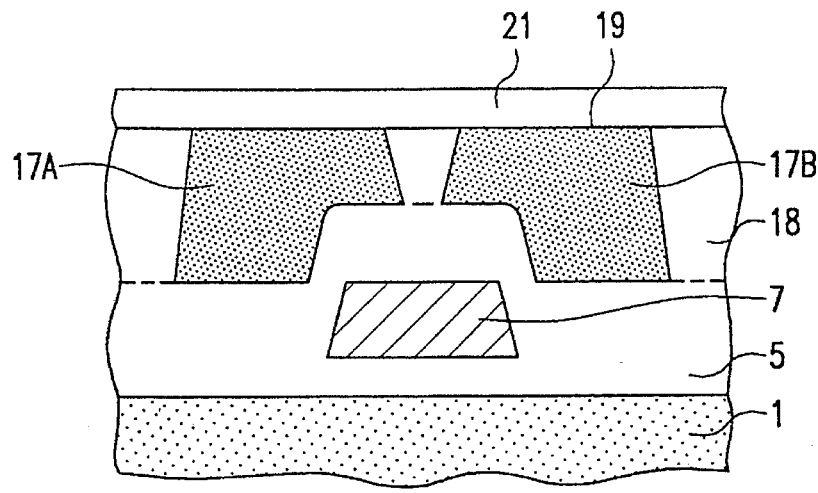
Figure 12:
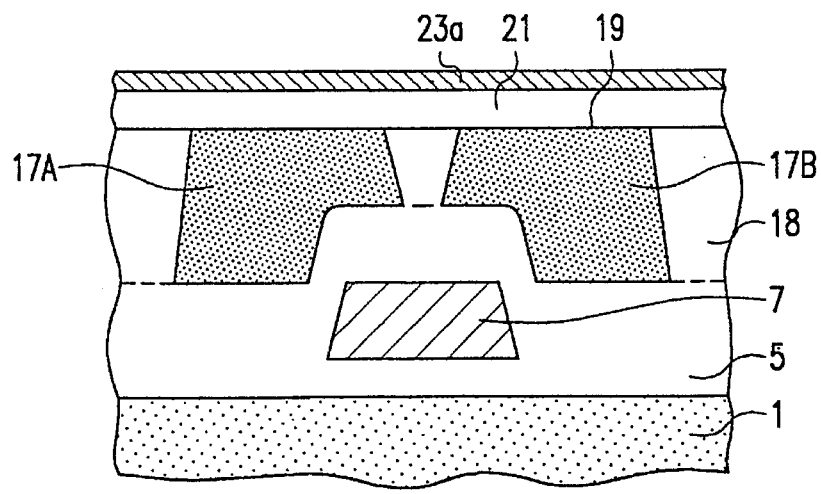
Figure 13:
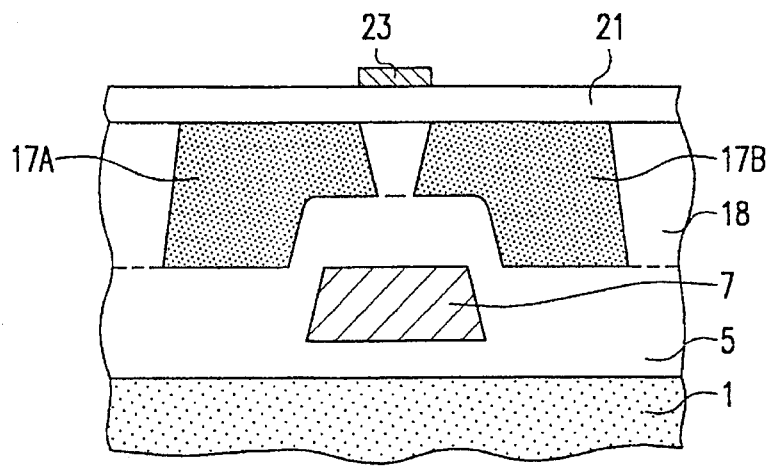
Figure 14:
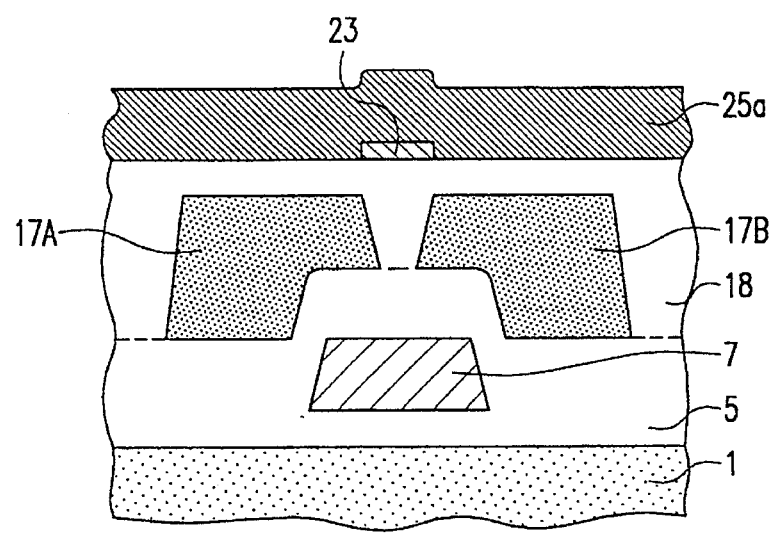
Figure 15:
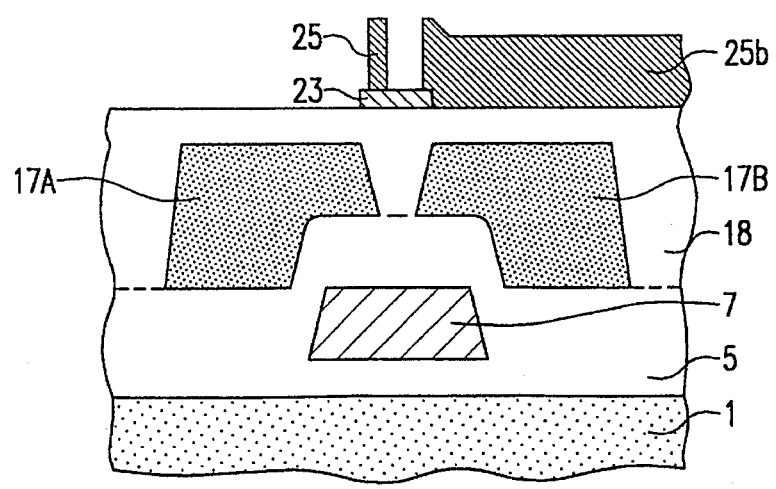
Figure 16:
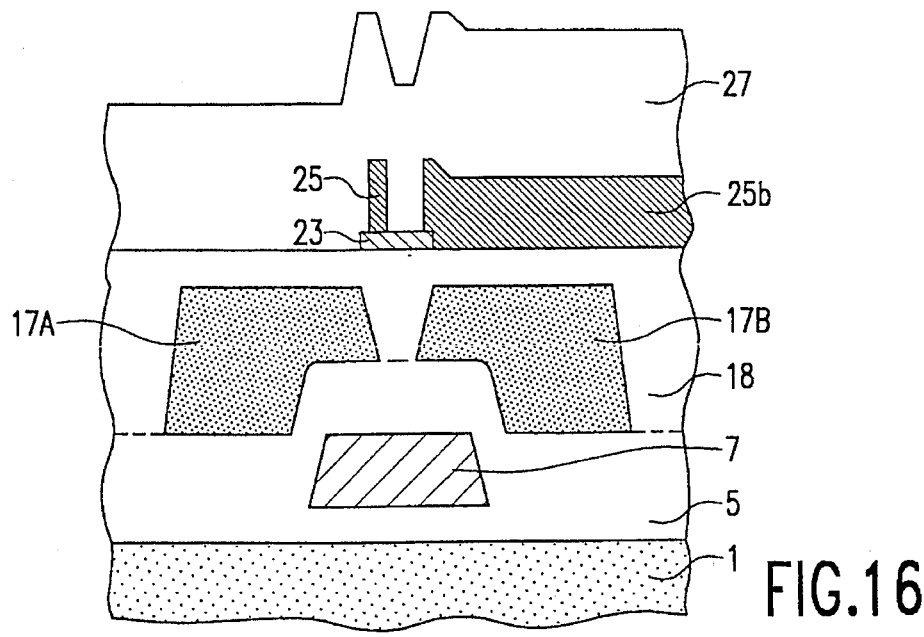
Figure 17:
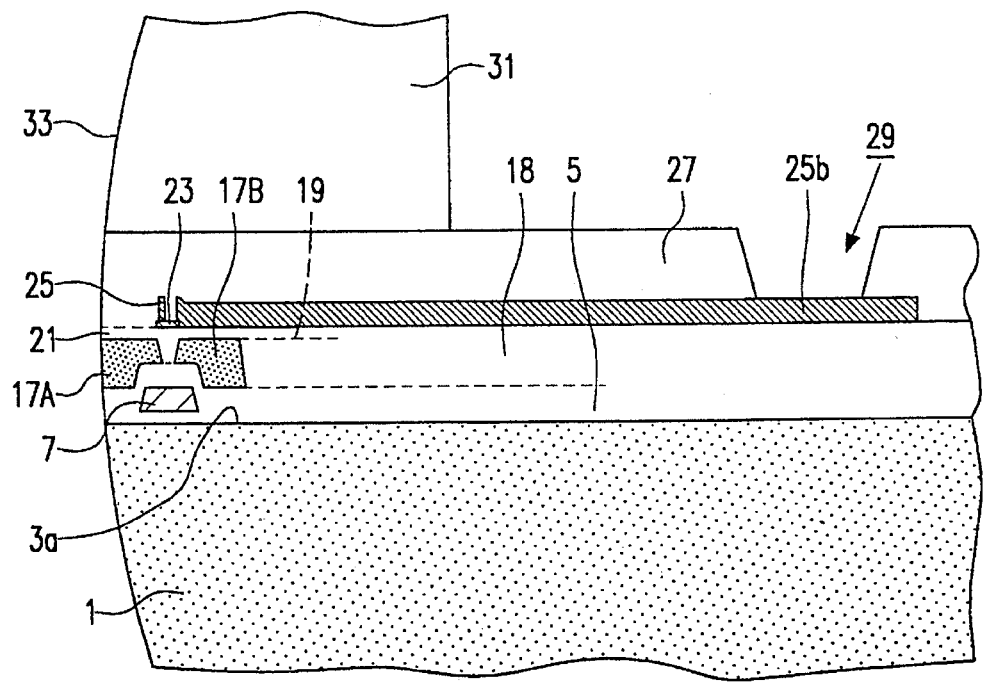
FIG. 17 shows a thin-film magnetic head according to the invention manufactured by means of the first embodiment of the method according to the invention.
Figure 18:
FIGS. 18 to 29 show various steps of a second embodiment of the method according to the invention.
Figure 19:
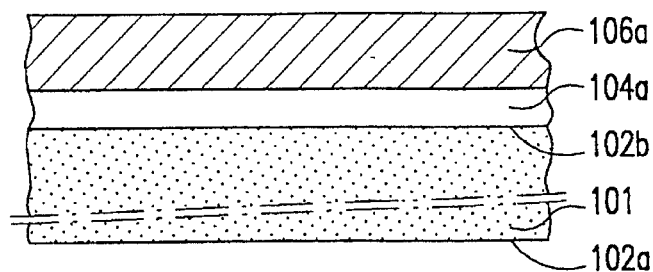
Figure 20:
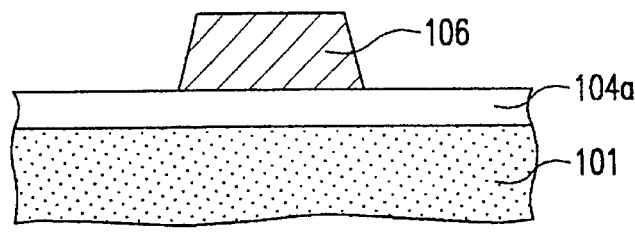
Figure 21:
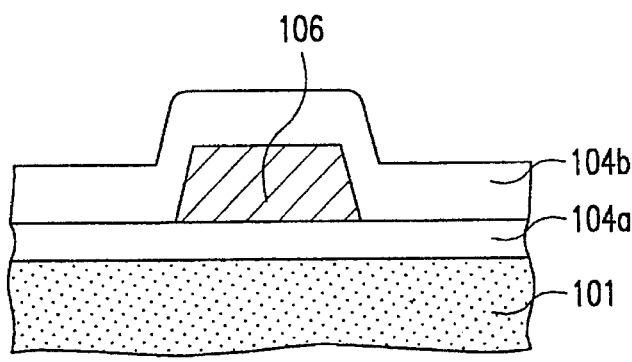
Figure 22:
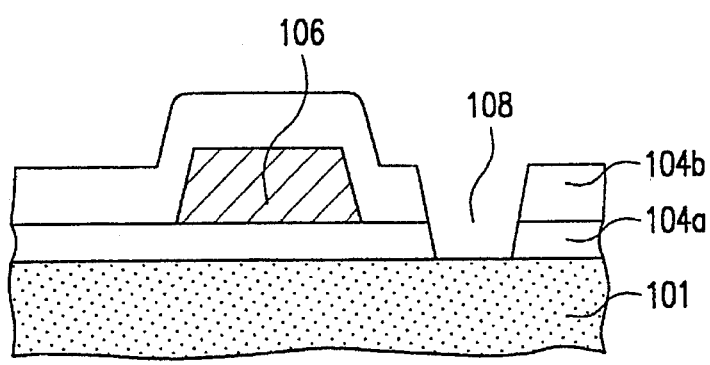
Figure 23:
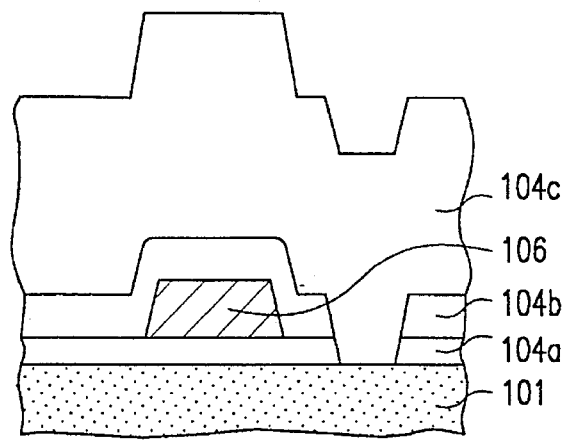
Figure 24:
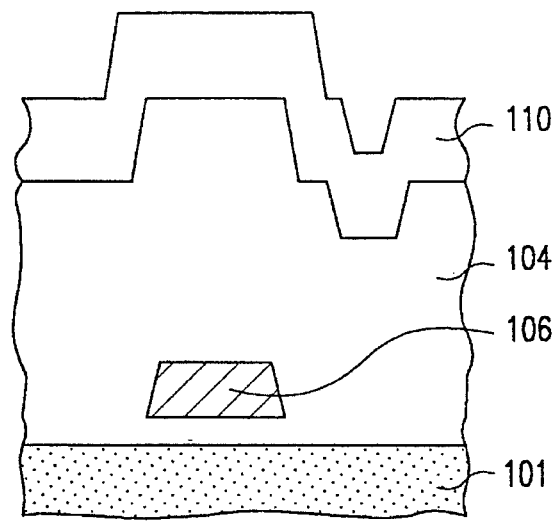
Figure 25:
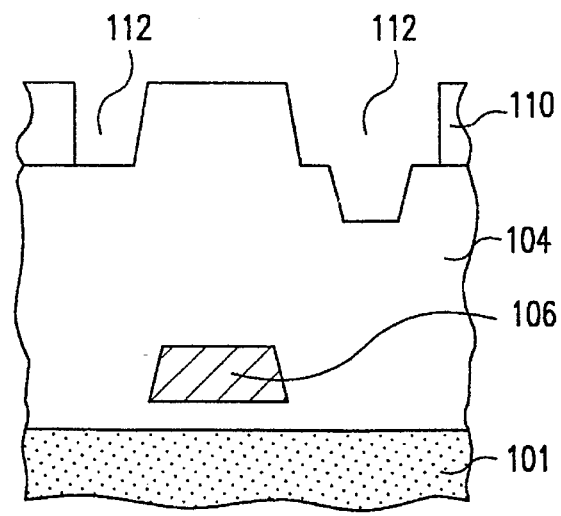
Figure 26:
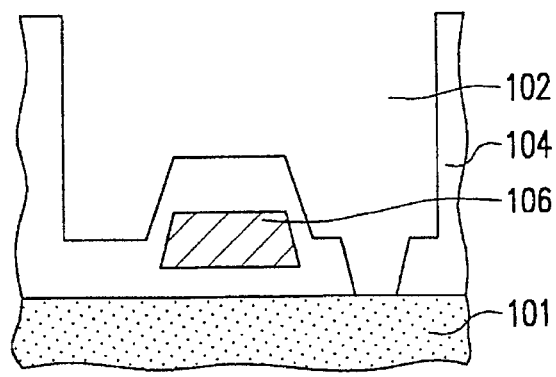
Figure 27:
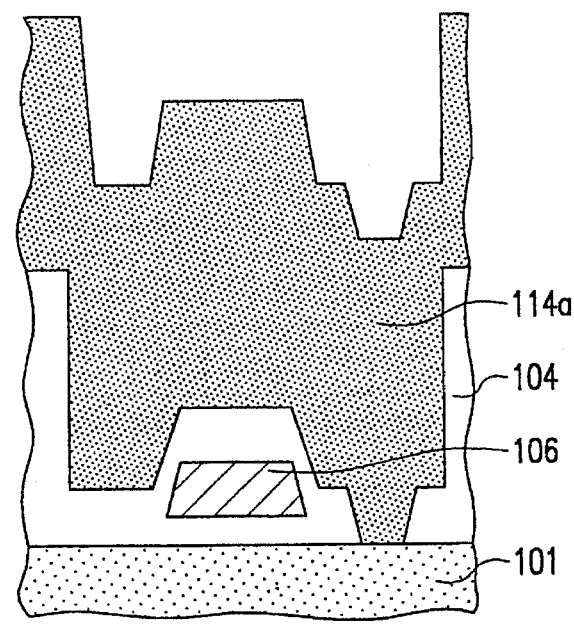
Figure 28:
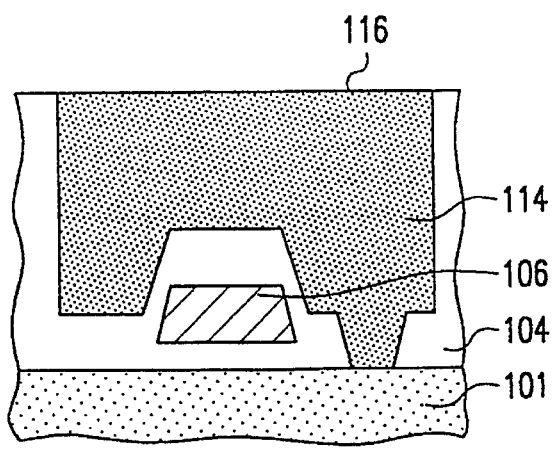
Figure 29:
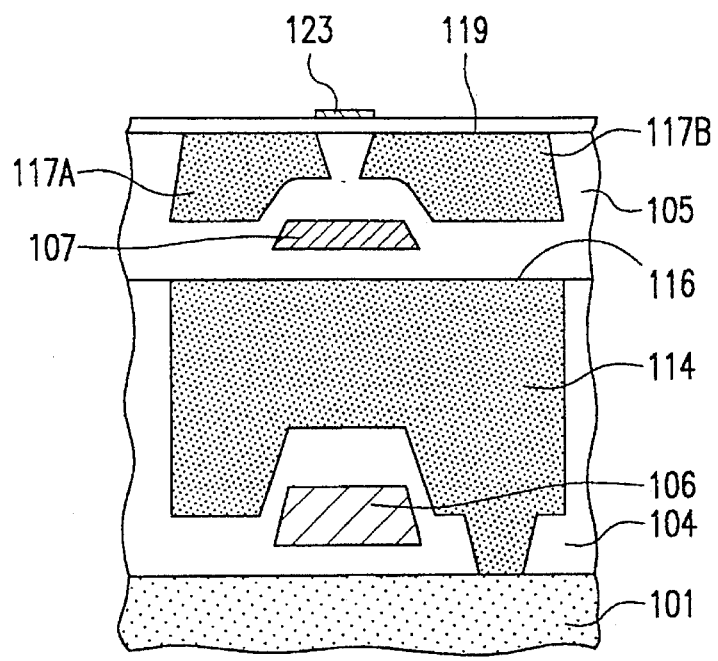

Within the scope of the invention it is possible to use the formed polished surface p shown in FIG. 9 as a main surface. In that case it is not necessary to provide a spacer layer 21 as is shown in FIG. 11. The desired insulation is ensured by the non-magnetic, electrically insulating material present between the soft-magnetic portions 17a and 17b used as flux guides and the polished surface p. The predetermined distance d of the polished surface p up to the upper face 17c can be achieved with great accuracy. The mechanochemical polishing treatment can be carried out with a colloidal suspension of SiO₂ particles in an alkali solution, for example, a standard solution commercially available under the trade name Syton.

Alternatively, zirconia may be used instead of quartz, while the insulation layers are preferably formed by means of sputtering.

A second embodiment of the method according to the invention will be described with reference to FIGS. 18 to 29. This method starts from a plate-shaped base element 101, preferably of ferrite which is polished on both sides for forming two parallel base faces 102a and 102b. An insulation layer 104a of quartz is provided by means of, for example PE-CVD on one of the base faces, in this embodiment the face 102b. An electrically conducting layer 106a of, for example mainly Au is provided on the layer 104a. This layer 106a is structured by means of known techniques to form an inductive transducing element or winding 106. Subsequently quartz is deposited for forming an insulation layer 104b and an aperture 108 is etched in the two insulation, layers 104a and 104b. Subsequently a relatively thick insulation layer 104c of quartz is provided. The layers 104a, 104b and 104c jointly constitute a base layer 104 of a nonmagnetic material. A layer 110 of a mask material, for example Mo is provided on the base layer 104 provided on the base element 101, with which mask material layer an aperture 112 is formed in the base layer 104. To this end, a photoresist is first deposited and structured on the layer 110, whereafter apertures 112 are formed in the layer 110 by means of etching for forming a mask. Subsequently, the base layer 104 is sputter-etched with the structured layer 110 as a mask for forming the aperture 102. After sputter-etching the remaining parts of the layer 110 are removed by wet-chemical etching. A layer 114a of a soft-magnetic material, for example a CoZrNb alloy is provided on the base layer 104 thus structured, while the aperture 102 is completely filled up. The layer 114a is used for forming a flux-guiding element 114. The base layer 104 provided with the filled aperture 102 is subsequently mechanochemically polished by means of a polishing agent comprising an alkaline colloidal SiO₂ solution to which diamond particles are added for creating a plane support face 116 which is free from scratches. A first insulation layer 105 of a non-magnetic material is formed on the base face 116 thus obtained.

Flux-guiding elements 117A and 117B are provided in the main layer 105 in a manner analogous to that described with reference to the first embodiment of the method according to the invention. In this method a main surface 119 is also formed by means of mechanochemical polishing, whereafter an MR element 123 is provided.

Figure 30:
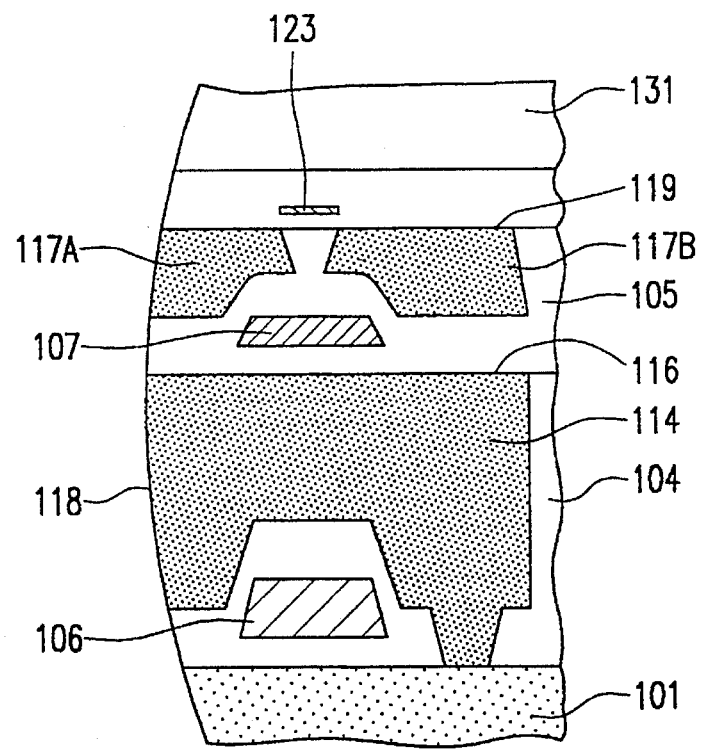
FIG. 30 shows a thin-film magnetic head according to the invention manufactured by means of the second embodiment of the method according to the invention.

A thin-film magnetic head manufactured by means of the second embodiment of the method according to the invention is shown in FIG. 30. The magnetic head has a head face 118 and comprises a base element 101 on which a non-magnetic base layer 104 is provided. The base layer 104 accommodates a winding 106 serving as an inductive transducing element and a flux guide 114 of a soft-magnetic material terminating in the head face 118. A non-magnetic main layer 105 consisting of a first and a second insulation layer and accommodating a front flux guide 117A terminating in the head face 118 and a rear flux guide 117B is provided on a mechanochemically polished support face 116. Both flux guides or flux-guiding elements are formed from a soft-magnetic material. If desired, a bias winding 107 may extend in the layer 105. The layer 105 has a mechanochemically polished main surface 119 on which—with a thin electrically insulating spacer layer being interpositioned—an MR element 123 is provided directly or indirectly. A protective layer, against which a counterblock 131 is secured, extends on the MR element.

It is to be noted that the invention is of course not limited to the embodiments shown. For example, within the scope of the invention it is possible to form the flux-guiding layer 114 by structuring a soft-magnetic layer by means of an etching process.

We claim:
1. A method of manufacturing a thin-film magnetic head comprising a magnetoresistive element and at least one flux-guiding element on a support, the method characterized by forming a first insulation layer of a non-magnetic mate- rial on a face of the support, depositing a soft-magnetic material to form a soft-magnetic layer on the first insulating layer, the soft magnetic layer having an upper face remote from the first insulation layer, thereafter removing a portion of the soft magnetic layer to form the at least one flux-guiding element and to expose a portion of the first insulating layer, and depositing non-magnetic material on the remaining portion of the soft-magnetic layer and on the exposed portion of the first insulation layer for forming a second insulation layer having an upper face remote from the soft-magnetic layer, said second insulation layer having a thickness, viewed in a direction transverse to the support face, such that the smallest distance between the support face and the upper face of the second insulation layer is larger than the largest distance between the support face and the upper face of the soft-magnetic layer, thereafter mechanochemically polishing the upper face of the second insulation layer to form a main surface, and providing a layer of a magnetoresistive material on the main surface to form the magnetoresistive element.

2. A method as claimed in claim 1, mechanochemical polishing is performed down to the soft-magnetic layer.

3. A method as claimed in claim 2, further comprising forming a spacer layer of a non-magnetic, electrically insulating material on the main surface obtained by mechanochemical polishing prior to providing the layer of magnetoresistive material.

4. A method as claimed in claim 1, wherein mechanochemical polishing of the second insulation layer to form the main surface is performed up to a predetermined distance to the upper face of the soft-magnetic layer, prior to providing the layer of magnetoresistive material.

5. A method as claimed in claim 1, wherein the support comprises a plate-shaped substrate having two parallel substrate faces provided by mechanically and/or mechanochemically polishing, one of said polished faces having the support face.

6. A method as claimed in claim 5, wherein the substrate is formed from a soft-magnetic material.

7. A method as claimed in claim 1, wherein the support is formed by providing an inductive transducing element, a base layer of a non-magnetic material and a flux-guiding layer on a base element, whereafter mechanochemically polishing the flux-guiding layer to form the support face.

8. A method as claimed in claim 7, further comprising providing the base element with two parallel base faces by mechanically and/or mechanochemically polishing, prior to providing the base layer on one of said faces.

9. A method as claimed in claim 7, wherein the base element is formed from a soft-magnetic material.

10. A method as claimed in claim 1, wherein the non-magnetic material is quartz.

11. A method as claimed in claim 1, wherein the non-magnetic material is zirconia.

12. A method as claimed in claim 2, wherein the layer portion of the soft-magnetic layer is removed by etching.

13. A method as claimed in claim 1, wherein the soft-magnetic material is an alloy selected from the group of alloys consisting of CoZrNb alloys, FeNbSi alloys, FeSiAl alloys and NiFe alloys.

14. A method as claimed in claim 1, wherein the soft-magnetic material is ferrite.

15. A method as claimed in claim 1, wherein the magnetoresistive material is a NiFe alloy.

16. A method as claimed in claim 7, wherein the base layer is formed from quartz.

17. A method as claimed in claim 7, wherein the base layer is formed from zirconia.

18. A method as claimed in claim 7, wherein a recess in the base layer is provided by etching, and wherein the flux-guiding layer is formed by filling the recess with a soft-magnetic material.

19. A method as claimed in claim 1, wherein mechanochemical polishing is performed with a colloidal suspension of $SiO_2$ particles in an alkali solution.

20. A method as claimed in claim 1, wherein mechanochemical polishing is performed with a mechanochemical polishing agent comprising a colloidal $SiO_2$ solution in which grains are present.

21. A method as claimed in claim 20, wherein the $SiO_2$ solution is an alkaline solution.

22. A method as claimed in claim 20, wherein the grains have an average particle size of less than 1.0 micrometer and a hardness which is better than the hardness of $SiO_2$.

23. A method as claimed in claim 20, wherein the grains are diamond.

24. A method as claimed in claim 20, wherein the grain concentration in the colloidal solution is less than 1 g per liter.

* * * * *